Patented Aug. 29, 1950

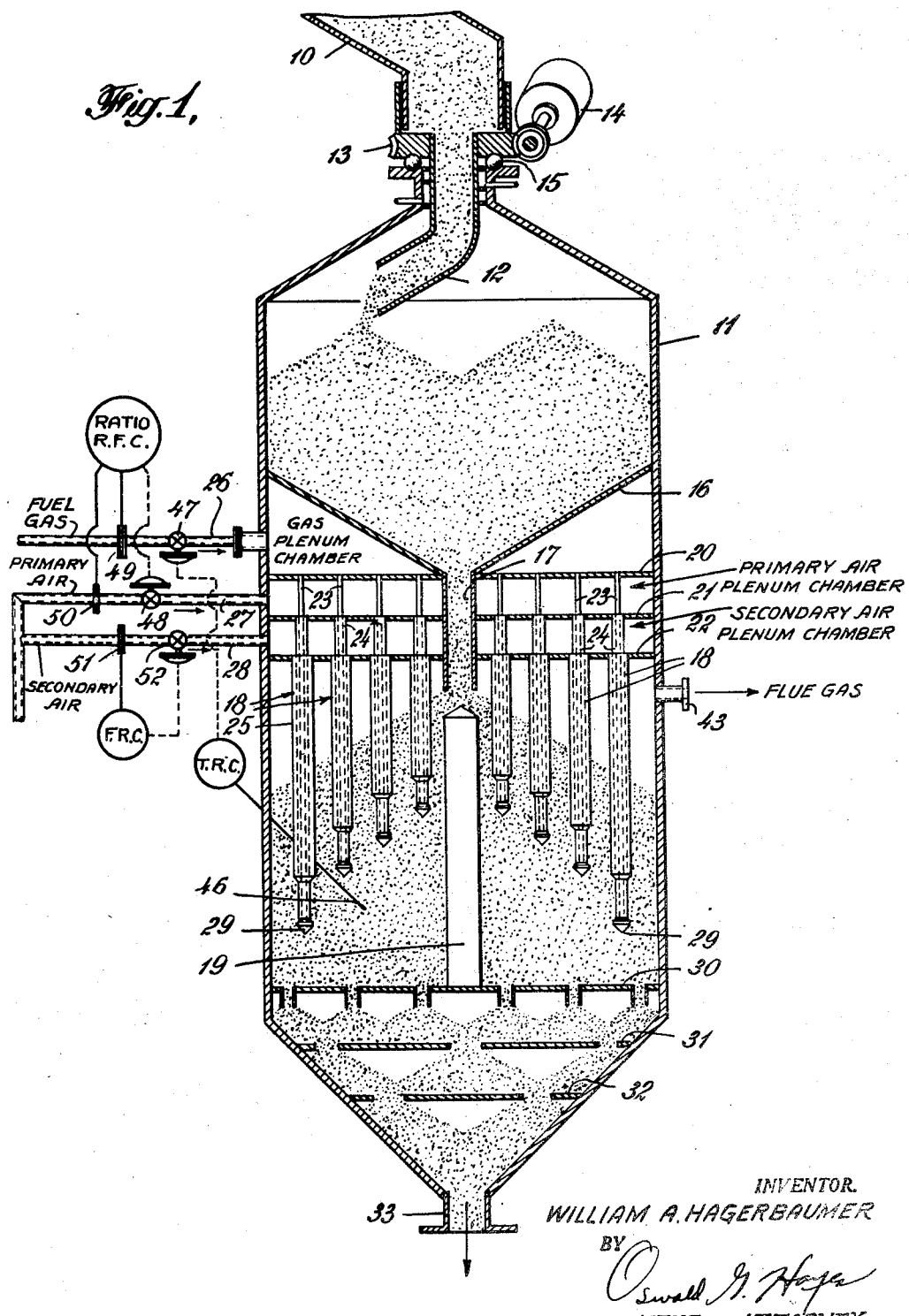

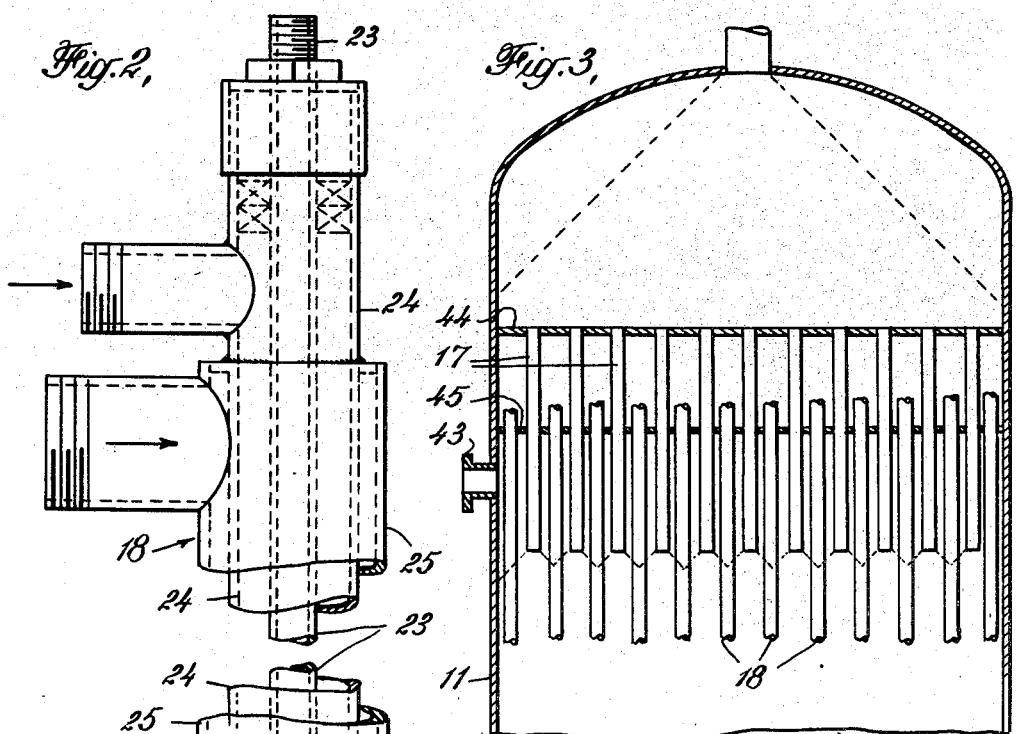
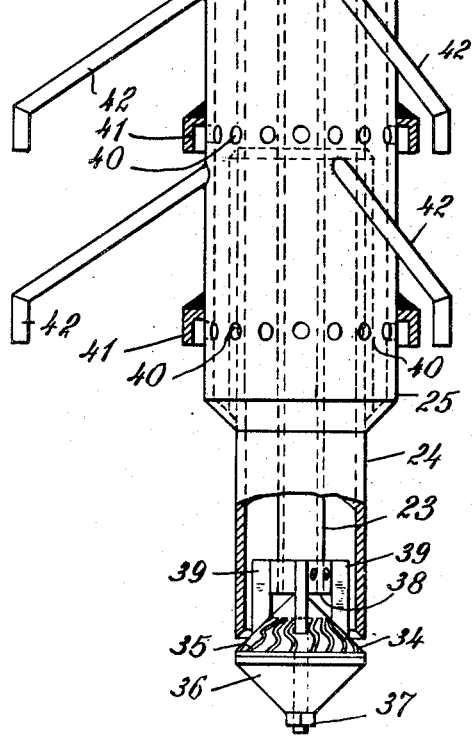
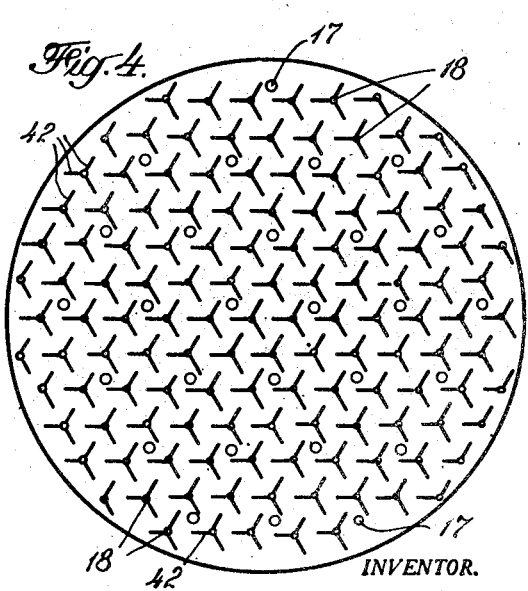

2,520,717

UNITED STATES PATENT OFFICE 2,520,717

CONTACTING

William A. Hagerbaumer, Westfield, N. J., assignor to Socony-Vacuum Oil Company, Incorporated, a corporation of New York Application January 2, 1947, Serial No. 719,904

15 Claims. (Cl. 263—30)

This invention relates to a process and apparatus for contacting a solid with a gas and is more particularly concerned with a contacting operation wherein the gas is a reaction mixture of at least two gaseous components. In a specific embodiment, the invention is concerned with combustion of gaseous fuel in air or other oxidizing gas in a bed of solid contact material in order to heat the latter; however, the invention is also applicable to other chemical reactions and the solid contacting agent may be a catalyst for a gaseous reaction.

The specific embodiments discussed hereinafter are designed primarily for heating a moving bed of solid granular heat transfer agent and the invention will be described in connection with such operations, which are to be taken as exemplary only. Essentially, the invention lies in a means and method for providing a contact path through a bed of granular solid to which reactants are admitted in a manner to minimize the formation of zones wherein the reaction proceeds at an unduly high rate. To accomplish this end, in the case of two reaction components, one component is wholly introduced to one end of the reaction path in admixture with a relatively small proportion of the other component and the remainder of the other component is added as small increments along the contact path. This concept may be applied to catalyzed reactions such as the oxidation of sulfur dioxide or ammonia and also to the partial oxidation of organic compounds. The reaction may also be among three components with two wholly introduced at one end of the path and the other component added in successive increments. As an example of a three-component gaseous reaction, note may be taken of vapor phase alkylation of isoparaffins. Thus, a mixture of isobutane and a vapor phase promoter such as propyl chloride may be introduced at one end of the path and a suitable olefin such as butylene may be added in successive increments to maintain the olefin concentration below that at which polymerization occurs.

Referring now to the exemplary operation of heating a granular heat transfer solid; this operation is advantageously conducted as a portion of a cyclic process for the manufacture of gaseous olefins and the like. Thus, gas oil or crude petroleum is readily converted to high yields of ethylene by reaction at temperatures on the order of 1600° F. for contacting times of a fraction of a second, say 0.2 second. More refractory hydrocarbons such as propane and ethane require higher temperatures and at still more elevated temperatures, acetylene can be produced.

In order to obtain the high temperature, short reaction time conditions required for these processes, the charge material is advantageously passed through a moving bed of highly heated granular solid and the gaseous reaction mixture is promptly quenched to avoid secondary reactions such as condensation to aromatics.

The apparatus and process of the present invention provide means for rapidly and efficiently heating granular solid in a substantially compact moving bed to afford a continuous supply of hot granular solid for the reactor. To accomplish this purpose, the granular solid heat transfer agent is passed downwardly through a heating zone as a substantially compact, continuously moving bed. A plurality of burners extend downward into the bed and are provided at the lower ends with burner tips from which issues a mixture of fuel and air. One of the flame components supplied at the burner tip is in an amount insufficient to completely consume the other component supplied at this point. The balance of the inadequate component is furnished in increments along the path of flame propagation and the heat of combustion is thus partially dissipated as it is generated and excessive flame temperatures which might damage the granular solid by fusion are avoided. The component supplied in increments may be either the fuel or the air but it is generally found desirable to supply all the fuel at the burner tip and bring the air in as increments. In preferred embodiments, the incremental air is supplied at points along the burner tube and also at a plurality of points thereabout to insure efficient mixing and combustion and propagation of the flame throughout the entire mass of granular solid.

These and other objects and advantages of the invention are more clearly understood by reference to the annexed drawings; wherein Figure 1 is a vertical section through a heater embodying the principles of the invention;

Figure 2 is a detail view of a burner tube assembly;

Figure 3 is a fragmentary vertical section of a modified type of heater; and

Figure 4 is a diagrammatic showing of the arrangement of elements according to a preferred embodiment.

Referring now to Figure 1, recycled granular solid, to be heated and supplied to a contacting reactor, is conducted from the top of an elevator or the like by a chute 10 to the top of a heater 11. In order to minimize the effects of stratification of granular solid in the chute 10, the stream of solids is introduced to the heater 11 by a rotating spout 12 having a bull gear 13 driven by motor 14. The bull gear and rotating spout assembly are carried by bearings indicated generally at 15 and the neck of the heater 11 through which the spout enters is provided with labyrinth baffles to which clean air or steam may be introduced to provide a seal against undue passage of gases in either direction through the neck.

The top of the heater 11 constitutes a hopper in which is maintained a bulk supply of the granular solid above a hopper floor 16. Granular solid is conducted from the hopper into the heating zone by a feed pipe 17. In the embodiment of Figure 1 only one feed pipe 17 is employed and the granular solid is diverted by an insert 19 therebelow to give a bed having an upper surface lying at about the angle of repose of the solids. The angle of repose is effected by the upward passage of gases therethrough and approaches the horizontal as the gas velocity approaches that which will suspend the solids. A plurality of burner tubes 18 extend downwardly into the moving bed to equal depths below the top surface thereof and the variation in the angle of repose with gas velocity must be taken into account in determining the position of the lower ends of the burner tubes 18.

Each of the burner tubes 18 comprises three concentric pipes for conducting gaseous fuel, primary air and secondary air into the burning zone. These three gaseous phases are supplied from plenum chambers defined by the hopper floor 16 and plates 20, 21 and 22. The inner pipe 23 of each of the burner tubes 18 opens to the upper plenum chamber between hopper floor 16 and plate 20. The intermediate pipe 24 opens to the second plenum chamber between plates 20 and 21 while the outer pipe 25 is open to the lower plenum chamber between plates 21 and 22. Gaseous fuel is supplied by a line 26 to the upper plenum chamber while primary and secondary air are supplied by lines 27 and 28, respectively, to the intermediate and lower plenum chambers. The inner tube 23 and the outer tube 24 are open at the bottom and gases flowing therefrom are mixed by a conical insert 29 thus introducing a mixture of primary air and gaseous fuel to the moving bed. Secondary air is discharged through orifices and tubes from the outer pipe 25 at points along its length as more particularly described below in connection with Figure 2. The highly heated solid is withdrawn from the bottom of heater 11 through a series of flow control plates 30, 31 and 32 and is discharged by outlet 33 for transfer to the reactor.

As shown in Figure 2, the supply of gases to the several pipes of burner tube 18 may be made by means of threaded connections adapted to communicate with suitable headers and manifolds not shown. The conical insert may be advantageously formed of an upper metal cone 34 (for example, stainless steel) which has a plurality of curving grooves 35 in the surface thereof to induce mixing of the fuel and primary air. A refractory cone 36 is advantageously secured to the metal cone 34 by an alloy bolt 37. This assembly is held in place by a collar 38 adjustably secured to the lower end of pipe 23 as by set screws. The collar 38 and the metal cone 34 are securely fastened together by supports 39.

The gap between the lower end of pipe 24 and the cone 34 is adjusted to insure that the mixture of primary air and gaseous fuel issues from the burner tip at high velocity to avoid combustion at the tip itself. Preheated air is used but it is supplied at such temperature that the mixture issuing from the tip is below its ignition temperature and combustion does not occur until the mixture is further heated by penetration of the moving bed thus heating it to ignition temperature. The products of partial burning of the gaseous fuel in the primary air pass upwardly through the moving bed and the secondary air required for complete combustion is admitted to the moving bed from the space between pipes 24 and 25. This admission of secondary air may be accomplished by means of orifices in the pipe 25 as indicated at 40. These orifices are protected from direct contact with the granular solid by cylindrical shields 41 welded at their upper ends to the pipe 25. It will be noted that this gives to the secondary air from orifices 40 a single velocity component directed downwardly as it enters the moving bed, thus avoiding disturbances of the flow of combustion gases due to horizontal velocity components of the secondary air.

Advantageously, a substantial proportion of the secondary air is introduced to the bed at points horizontally spaced from the burner tube 18. Air tubes 42 are secured to the pipe 25 for this purpose and communicate with the interior thereof. It will be noted that the lower ends of the tubes 42 are also directed downwardly to thus avoid a horizontal velocity component of secondary air admitted in this manner.

As will be seen from Figure 1, the products of combustion pass upwardly from the moving bed of granular solid, are disengaged from the solid at the upper surface of the bed and enter a free space about the burner tubes 18 and below the plate 22 from which they are withdrawn by outlet port 43 for transfer to a suitable stack or economizer. If desired, means may be introduced to equalize the flow from various portions of the bed as by insertion of a baffle plate having a number of orifices to throttle the gas to a desired velocity across the top of the bed.

Figure 3 shows an arrangement of heater 11 wherein a number of granular solid feed legs 17 are employed, each depending from a plate 44 which defines the floor of the hopper. The burner tubes 18 in this figure may be that shown specifically in Figure 2 and the space below plate 44 can be advantageously used for manifolds and headers. A second plate 45 may be used to set off the manifolding space from the heating zone and thus avoid difficulties arising from circulation of combustion gases about the manifolds. Figure 3 shows a large number of feed pipes 17 but such a number is not essential as will be seen from reference to Figures 1 and 4.

Figure 4 represents, diagrammatically, a vertical section through a reactor having the burner tubes 18 arranged on a triangular pattern. The secondary air tubes 42 are arranged about the burner tubes 18 in groups of 3. Since each of the secondary air tubes 42 extends half-way to the next adjacent burner tube 18, it will be seen that each burner tube 18 is surrounded by six points of secondary air introduction, one point at each angle of a regular hexagon having its center coincident with the center line of tube 18. As the products of partial combustion move upwardly through the moving bed of granular solid, they pass through a plurality of levels of secondary air introduction. At each of these levels the moving gases surrounding each burner tube 18 meet with additional air supplied at the wall of tube 18 and at six points equally spaced thereabout. This results in highly efficient mixing of the secondary air with the products of partial combustion thus giving a highly efficient combustion of the fuel and a high uniformity of flame temperatures along the path of flame propagation.

This system is well adapted to automatic control. For example, referring to Figure 1, a thermocouple 46 in the moving bed can be employed to actuate a valve 47 on the fuel supply line 26 thus adjusting the rate of fuel supply in accordance with temperature of the heated solid. A constant ratio between gaseous fuel and primary air is obtained by automatic control of valve 48 on line 27. This control is actuated responsive to orifice flow meters 49 and 50 on the lines 26 and 27 respectively. The flow of secondary air may be advantageously maintained constant by using an orifice flow meter 51 to control valve 52.

I claim:

1. A contactor comprising a vertical vessel, inlet means to admit a granular solid to the upper portion of said vessel, outlet means to withdraw granular solids from the bottom of said vessel, a plate in said vessel, constituting the floor of a hopper in the upper portion of said vessel below said inlet means, three plates spaced successively below said hopper floor extending across said vessel and defining an upper, a lower and an intermediate plenum chamber, a plurality of fuel pipes extending through said three plates downwardly into said vessel therebelow and communicating with said upper chamber, said fuel pipes being arranged in a triangular pattern with each three adjacent fuel pipes at the angles of identical equilateral triangles, a primary air pipe communicating with said intermediate chamber extending downwardly into said vessel below said plates about and coaxial with each of said fuel pipes, means at the lower end of each of said primary air pipes for mixing effluent therefrom with effluent from the fuel pipe coaxial therewith, a secondary air pipe communicating with said lower chamber extending downwardly into said vessel below said plates about and coaxial with each of said primary air pipes, each of said secondary air pipes having orifices therethrough, a plurality of feed tubes extending outwardly from each of said secondary air pipes along sides of said triangles to points about midway between adjacent pipes, the said tubes of adjacent pipes being on different sides of said triangles, and the discharge of each of said tubes being downwardly directed, at least one tubular feed leg for conducting granular solid downwardly from said hopper to a level spaced downwardly from the lowermost of said plates and means to withdraw gas from the space between said level and the lowermost of said plates.

2. A contactor comprising a vertical vessel, inlet means to admit a granular solid to the upper portion of said vessel, outlet means to withdraw granular solids from the bottom of said vessel, three plates spaced successively below said inlet means extending across said vessel and defining an upper, a lower and an intermediate plenum chamber, a plurality of fuel pipes extending through said three plates downwardly into said vessel therebelow and communicating with said upper chamber, said fuel pipes being arranged in a triangular pattern with each three adjacent fuel pipes at the angles of identical equilateral triangles, a primary air pipe communicating with said intermediate chamber extending downwardly into said vessel below said plates about and coaxial with each of said fuel pipes, means at the lower end of each of said primary air pipes for mixing effluent therefrom with effluent from the fuel pipe coaxial therewith, a secondary air pipe communicating with said lower chamber extending downwardly into said vessel below said plates about and coaxial with each of said primary air pipes, each of said secondary air pipes having orifices therethrough, a plurality of feed tubes extending outwardly from each of said secondary air pipes along sides of said triangles to points about midway between adjacent pipes, the said tubes of adjacent pipes being on different sides of said triangles, and the discharge of each of said tubes being downwardly directed, at least one tubular feed leg for conducting granular solid downwardly from said inlet means to a level spaced downwardly from the lowermost of said plates and means to withdraw gas from the space between said level and the lowermost of said plates.

3. A contactor comprising a vertical vessel, inlet means to admit a granular solid to the upper portion of said vessel, outlet means to withdraw granular solids from the bottom of said vessel, a plurality of fuel pipes extending downwardly into said vessel from the upper portion thereof, said fuel pipes being arranged in a triangular pattern with each three adjacent fuel pipes at the angles of identical equilateral triangles, a primary air pipe extending downwardly into said vessel about and coaxial with each of said fuel pipes, means at the lower end of each of said primary air pipes for mixing effluent therefrom with effluent from the fuel pipe coaxial therewith, a secondary air pipe extending downwardly into said vessel about and coaxial with each of said primary air pipes, each of said secondary air pipes having orifices therethrough, a plurality of feed tubes extending outwardly from each of said secondary air pipes along sides of said triangles to points about midway between adjacent pipes, the said tubes of adjacent pipes being on different sides of said triangles, and the discharge of each of said tubes being downwardly directed, at least one tubular feed leg for conducting granular solid downwardly from said inlet means to a level spaced downwardly from said inlet means, means to separately supply fluid material to said fuel pipes, said primary air pipes and said secondary air pipes, and means to withdraw gas from the space above said level.

4. A contactor comprising a vertical vessel, inlet means to admit a granular solid to the upper portion of said vessel, outlet means to withdraw granular solids from the bottom of said vessel, a plate in said vessel, constituting the floor of a hopper in the upper portion of said vessel below said inlet means, three plates spaced successively below said hopper floor extending across said vessel, and defining an upper, a lower and an intermediate plenum chamber, a plurality of fuel pipes extending through said three plates downwardly into said vessel therebelow and communicating with said upper chamber, a primary air pipe communicating with said intermediate chamber extending downwardly into said vessel below said plates about and coaxial with each of said fuel pipes, means at the lower end of each of said primary air pipes for mixing effluent therefrom with effluent from the fuel pipe coaxial therewith, a secondary air pipe communicating with said lower chamber extending downwardly into said vessel below said plates about and coaxial with each of said primary air pipes, each of said secondary air pipes having orifices therethrough, a plurality of feed tubes extending outwardly from each of said secondary air pipes to points about midway between adjacent pipes, and the discharge of each of said tubes being downwardly directed, at least one tubular feed leg for conducting granular solid downwardly from said hopper to a level spaced downwardly from the lowermost of said plates and means to withdraw gas from the space between said level and the lowermost of said plates.

5. A contactor comprising a vertical vessel, inlet means to admit a granular solid to the upper portion of said vessel, outlet means to withdraw granular solids from the bottom of said vessel, three plates spaced successively below said inlet means extending across said vessel and defining an upper, a lower and an intermediate plenum chamber, a plurality of fuel pipes extending through said three plates downwardly into said vessel therebelow and communicating with said upper chamber, a primary air pipe communicating with said intermediate chamber extending downwardly into said vessel below said plates about and coaxial with each of said fuel pipes, means at the lower end of each of said primary air pipes for mixing effluent therefrom with effluent from the fuel pipe coaxial therewith, a secondary air pipe communicating with said lower chamber extending downwardly into said vessel below said plates about and coaxial with each of said primary air pipes, each of said secondary air pipes having orifices therethrough, a plurality of feed tubes extending outwardly from each of said secondary air pipes to points about midway between adjacent pipes, and the discharge of each of said tubes being downwardly directed, at least one tubular feed leg for conducting granular solid downwardly from said inlet means to a level spaced downwardly from the lowermost of said plates and means to withdraw gas from the space between said level and the lowermost of said plates.

6. A contactor comprising a vertical vessel, inlet means to admit a granular solid to the upper portion of said vessel, outlet means to withdraw granular solids from the bottom of said vessel, a plurality of fuel pipes extending downwardly into said vessel from the upper portion therof, a primary air pipe extending downwardly into said vessel about and coaxial with each of said fuel pipes, means at the lower end of each of said primary air pipes for mixing effluent therefrom with effluent from the fuel pipe coaxial therewith, a secondary air pipe extending downwardly into said vessel about and coaxial with each of said primary air pipes, each of said secondary air pipes having orifices therethrough, a plurality of feed tubes extending outwardly from each of said secondary air pipes to points about midway between adjacent pipes, and the discharge of each of said tubes being downwardly directed, at least one tubular feed leg for conducting granular solid downwardly from said inlet means to a level spaced downwardly from said inlet means, means to separately supply fluid material to said fuel pipes, said primary air pipes and said secondary air pipes, and means to withdraw gas from the space above said level.

7. A contactor comprising a vertical vessel, inlet means to admit a granular solid to the upper portion of said vessel, outlet means to withdraw granular solids from the bottom of said vessel, a plate in said vessel, constituting the floor of a hopper in the upper portion of said vessel below said inlet means, three plates spaced successively below said hopper floor extending across said vessel and defining an upper, a lower and an intermediate plenum chamber, a plurality of fuel pipes extending through said three plates downwardly into said vessel therebelow and communicating with said upper chamber, a primary air pipe communicating with said intermediate chamber extending downwardly into said vessel below said plates about and coaxial with each of said fuel pipes, means at the lower end of each of said primary air pipes for mixing effluent therefrom with effluent from the fuel coaxial therewith, a secondary air pipe communicating with said lower chamber extending downwardly into said vessel below said plates about and coaxial with each of said primary air pipes, each of said secondary air pipes having orifices therethrough, a plurality of feed tubes extending outwardly from each of said secondary air pipes to points about midway between adjacent pipes, at least one tubular feed leg for conducting granular solid downwardly from said hopper to a level spaced downwardly from the lowermost of said plates and means to withdrawn gas from the space between said level and the lowermost of said plates.

8. A contactor comprising a vertical vessel, inlet means to admit a granular solid to the upper portion of said vessel, outlet means to withdraw granular solids from the bottom of said vessel, three plates spaced successively below said inlet means extending across said vessel and defining an upper, a lower and an intermediate plenum chamber, a plurality of fuel pipes extending through said three plates downwardly into said vessel therebelow and communicating with said upper chamber, a primary air pipe communicating with said intermediate chamber extending downwardly into said vessel below said plates about and coaxial with each of said fuel pipes, means at the lower end of each of said primary air pipes for mixing effluent therefrom with effluent from the fuel pipe coaxial therewith, a secondary air pipe communicating with said lower chamber extending downwardly into said vessel below said plates about and coaxial with each of said primary air pipes, each of said secondary air pipes having orifices therethrough, a plurality of feed tubes extending outwardly from each of said secondary air pipes to points about midway between adjacent pipes, at least one tubular feed leg for conducting granular solid downwardly from said inlet means to a level spaced downwardly from the lowermost of said plates and means to withdraw gas from the space between said level and the lowermost of said plates.

9. A contactor comprising a vertical vessel, inlet means to admit a granular solid to the upper portion of said vessel, outlet means to withdraw granular solids from the bottom of said vessel, a plurality of fuel pipes extending downwardly into said vessel from the upper portion thereof, a primary air pipe extending downwardly into said vessel about and coaxial with each of said fuel pipes, means at the lower end of each of said fuel pipes, means at the lower end of each of said primary air pipes for mixing effluent therefrom with effluent from the fuel pipe coaxial therewith, a secondary air pipe extending downwardly into said vessel about and coaxial with each of said primary air pipes, each of said secondary air pipes having orifices therethrough, a plurality of feed tubes extending outwardly from each of said secondary air pipes to points about midway between adjacent pipes, at least one tubular feed leg for conducting granular solid downwardly from said inlet means to a level spaced downwardly from said inlet means, means to separately supply fluid material to said fuel pipes, said primary air pipes and said secondary air pipes, and means to withdraw gas from the space above said level.

10. A burner comprising an inner tube, an intermediate tube thereabout, an outer tube about said intermediate tube, said inner and said intermediate tubes terminating in open adjacent ends to provide a burner tip, a conical throttling insert in said tip, said outer tube terminating in a closed end spaced from said tip, orifices in the wall of said outer tube at spaced intervals along the said outer tube, cylindrical shields about said outer tube adjacent said orifices, means connecting said outer tube and said shields on the sides thereof remote from said tip thus providing openings directed toward said tip, secondary tubes extending outwardly from said outer tube and communicating with the interior thereof, the outer ends of said secondary tubes being directed parallel to the axis of said outer tube and in the direction of said tip and means to separately supply fluid to each of said inner tube, said intermediate tube and said outer tube.

11. A burner comprising an inner tube, an intermediate tube thereabout, an outer tube about said intermediate tube, said inner and said intermediate tubes terminating in open adjacent ends to provide a burner tip, means to mix effluent from said inner and intermediate tubes at said tip, said outer tube terminating in a closed end spaced from said tip, orifices in the wall of said outer tube at spaced intervals along the said outer tube, cylindrical shields about said outer tube adjacent said orifices, means connecting said outer tube and said shields on the sides thereof remote from said tip thus providing openings directed toward said tip, secondary tubes extending outwardly from said outer tube and communicating with the interior thereof, the outer ends of said secondary tubes being directed parallel to the axis of said outer tube and in the direction of said tip and means to separately supply fluid to each of said inner tube, said intermediate tube and said outer tube.

12. A burner comprising an inner tube, an intermediate tube thereabout, an outer tube about said intermediate tube, said inner and said intermediate tubes terminating in open adjacent ends to provide a burner tip, a conical throttling insert in said tip, said outer tube terminating in a closed end spaced from said tip, orifices in the wall of said outer tube at spaced intervals along the said outer tube, secondary tubes extending outwardly from said outer tube and communicating with the interior thereof, and means to separately supply fluid to each of said inner tube, said intermediate tube and said outer tube.

13. A burner comprising an inner tube, an intermediate tube thereabout, an outer tube about said intermediate tube, said inner and said intermediate tubes terminating in open adjacent ends to provide a burner tip, means to mix effluent from said inner and intermediate tubes at said tip, said outer tube terminating in a closed end spaced from said tip, orifices in the wall of said outer tube at spaced intervals along the said outer tube, secondary tubes extending outwardly from said outer tube and communicating with the interior thereof, and means to separately supply fluid to each of said inner tube, said intermediate tube and said outer tube.

14. A process for heating granular solid material which comprises passing said material downwardly as a substantially compact moving bed through a heating zone, injecting a mixture of gaseous fuel and insufficient air for combustion thereof into said bed at a plurality of primary points in the lower portion thereof, injecting into said bed the additional air required for complete combustion of said fuel as separate increments on at least one level spaced above said primary points, a first portion of the increment at each of said levels being introduced as streams directed downwardly from points substantially directly above said primary points and the remaining portion being introduced as streams directed downwardly from points equally spaced in said bed from the points of introduction of said first portion.

15. A process for heating granular solid material which comprises passing said material downwardly as a substantially compact moving bed through a heating zone, injecting a mixture of gaseous fuel and insufficient air for combustion thereof into said bed at a plurality of primary points in the lower portion thereof, injecting into said bed the additional air required for complete combustion of said fuel as separate increments on at least one level spaced above said primary points, a first portion of the increment at each of said levels being introduced as streams from points substantially directly above said primary points and the remaining portion being introduced as streams from points equally spaced in said bed from the points of introduction of said first portion.

WILLIAM A. HAGERBAUMER.

REFERENCES CITED

The following references are of record in the file of this patent:

UNITED STATES PATENTS

| Number | Name | Date |
|---|---|---|
| 740,043 | Reid | Sept. 29, 1903 |
| 1,385,509 | Vance | July 26, 1921 |
| 1,448,340 | Fleischer | Mar. 13, 1923 |
| 1,925,942 | Simpson | Sept. 5, 1933 |
| 2,020,504 | Hantla | Nov. 12, 1935 |
| 2,055,366 | Schrader | Sept. 22, 1936 |
| 2,220,572 | Knupp | Nov. 5, 1940 |
| 2,389,027 | Corbin et al. | Nov. 13, 1945 |
| 2,417,049 | Bailey | Mar. 11, 1947 |
| 2,443,259 | Martin | June 15, 1948 |

FOREIGN PATENTS

| Number | Country | Date |
|---|---|---|
| 828,944 | France | 1938 |